Patented Mar. 14, 1944

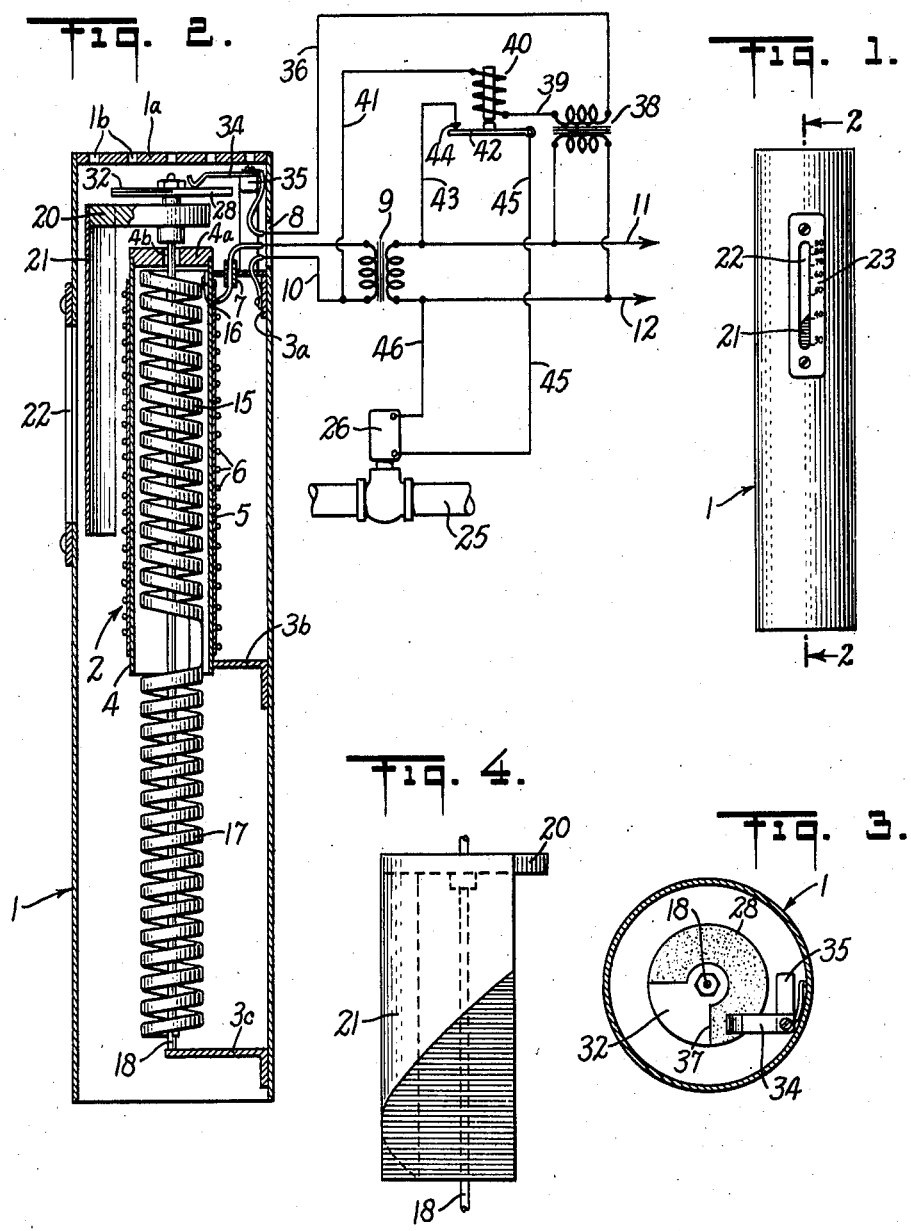

2,343,878

UNITED STATES PATENT OFFICE 2,343,878

HUMIDITY MEASURING AND CONTROL APPARATUS

Albert Allen and Robert W. Cushman, Sharon, Mass., assignors to The Foxboro Company, Foxboro, Mass., a corporation of Massachusetts Application March 6, 1941, Serial No. 381,964

6 Claims. (Cl. 236—44)

This invention relates to apparatus for measuring and indicating or controlling the concentration of a fluid in a material, and more particularly for measuring and indicating or controlling the relative humidity of an atmosphere.

It has been proposed that the humidity or vapor concentration of an atmosphere be measured by measuring the temperature at which a medium having an affinity for one component of the atmosphere is in vapor pressure equilibrium with the atmosphere. Such a method of measuring humidity or vapor concentration may be illustratively described as follow: A suitable porous medium such as paper is impregnated with a hygroscopic material, for example a salt such as lithium chloride, capable of absorbing water from the atmosphere. Suitable hygroscopic materials are usually characterized by the fact that they have an affinity for water which decreases with increasing temperature and have an electrical conductivity which is a function of the proportion of absorbed water which they contain.

The impregnated porous medium is exposed to the atmosphere of which the humidity is to be measured. The lithium chloride or other hygroscopic material tends to absorb water from the atmosphere and this tendency to absorb water decreases with increasing temperature. If the salt is heated, a temperature is eventually reached such that there is no further tendency for the salt to absorb water from the atmosphere, that is, the salt is in moisture equilibrium with the atmosphere. This equilibrium temperature varies with and depends upon the percent by volume of water vapor in the atmosphere, and hence is a measure of the absolute humidity of the atmosphere.

The moist salt is a conductor of electricity and in the present embodiment the heating of the salt is accomplished by passing electrical energy directly therethrough. The salt, in effect, acts as an automatic controller to maintain the flow of electrical energy therethrough at such a value as to maintain the salt at the equilibrium temperature described above. If the temperature of the salt rises above the equilibrium value, the salt tends to lose water to the atmosphere and its electrical conductivity decreases to decrease the flow of heating current therethrough, thus causing the temperature of the salt to fall. If, on the other hand, the temperature of the salt falls below the equilibrium temperature, the salt takes on water from the atmosphere, its conductivity increases, and hence more electrical energy flows through the salt to increase its temperature to the equilibrium value. Thus the temperature of the salt is automatically maintained at this equilibrium value which, as noted, is a measure of the absolute humidity of the ambient atmosphere.

A value indicative of relative humidity may be obtained by suitably correlating the value of absolute humidity with the value of the temperature of the ambient atmosphere. If, for example, ambient temperature is subtracted from the equilibrium temperature described above, a value is obtained which is indicative of the relative humidity of the atmosphere. The temperature difference thus obtained for a given value of relative humidity varies slightly with changes in ambient temperature but is sufficiently exact to give commercially satisfactory results in many cases where the value of ambient temperature undergoes relatively little variation. It is an object of the present invention to provide apparatus that measures such a temperature difference to indicate the relative humidity of an atmosphere and, if desired, controls the relative humidity of an atmosphere to maintain it substantially at a desired value or within a desired range of values.

The many objects and advantages of the present invention may best be appreciated by referring to the accompanying drawing which illustrates one embodiment of the invention and wherein:

Figure 1 is a front elevation of a device embodying the present invention;

Figure 2 is a sectional view of the device of Figure 1, taken on line 2—2 thereof and showing certain movable parts in elevation;

Figure 3 is a top plan view of Figure 2 with a cover removed; and

Figure 4 is a detail view of the indicating disc and card.

Referring now to the drawing, and particularly to Figure 2, there is shown a cylindrical housing 1 open at the bottom and partially closed at the top by a cap 1a. Centrally located within the housing 1 there is a tubular humidity-responsive element generally designated by the numeral 2. The element 2 is supported from the wall of the housing 1 by the supports 3a and 3b and comprises a relatively thin-walled tube 4, preferably made of an electrically conductive material, such as, for example, silver. At its top the tube 4 is provided with a bushing or cap 4a preferably constructed of dielectric material.

Around the tube 4 there is wrapped a layer of paper or other porous medium impregnated with a suitable hygroscopic material such as lithium chloride. A conductor such as the wire 6 is helically wound around the layer of impregnated paper 5 in such manner that electrical energy supplied to the element 4 may pass from the conductor 6 to the tube 4 only by passing through the impregnated layer of paper 5. The conductor 6 may be made of corrosion resistant material such, for example, as silver wire, in order to resist the corrosive action of the moist salt in the impregnated paper.

The conductor 6 at its upper end passes through a tubular insulator 7 mounted in the support 3a and preferably made of a suitable dielectric material such as Bakelite, and thence through an aperture 8 in the housing 1 to the secondary winding of a transformer 9. The secondary of transformer 9 is also connected by a conductor 10 with the housing 1 which through the support 3b is electrically connected with the tube 4, thus completing an electrical circuit which includes conductor 6, impregnated paper 5, and the tube 4. Electric power to heat the element 2 is supplied to the primary of transformer 9 from any suitable source through the leads 11 and 12. As described above, the flow of electrical energy through the salt solution with which the paper 5 is impregnated raises the temperature of the salt and hence the temperature of the element 2 to a value where the salt is in moisture equilibrium with the surrounding atmosphere. The value of this equilibrium temperature varies with the concentration of moisture in the atmosphere and may be used as a measure of the absolute humidity of the atmosphere.

The temperature of the element 2 is measured by a bimetallic helix 15 which is supported at its upper end from the inner surface of the tube 4 as at 16. The helix 15 may be of a suitable and well known type and tends to unwind as the temperature of the element 2 increases and to wind up as the temperature of the element 2 decreases. At its lower end helix 15 is connected to and supports a second bimetallic helix 17 constructed similarly to the helix 15 but oppositely wound. Helix 17 is located below the humidity-responsive element 2 and hence is responsive to the temperature of the ambient atmosphere.

Centrally located within the helices 15 and 17 there is a shaft 18 which is rotatably mounted on a support 3c fixed to the housing 1. The lower end of helix 17 is secured to shaft 18 in such manner that movement of the helices 15 and 17 rotates the shaft. Since the helices 15 and 17 are oppositely wound, the shaft 18 is moved in accordance with the differential movement of the helices and hence is effectively positioned in accordance with the difference between the temperature of the humidity-responsive element 2 and the temperature of the ambient atmosphere. This temperature difference, as described above, may be used as a measure of relative humidity.

The shaft 18 actuates an indicating mechanism to indicate the value of relative humidity. The shaft extends upwardly through a hole 4b in the cap 4a and near the top of the housing 1 is connected to and supports a disc 20 having a depending indicating card 21 (best shown in Figure 4). Rotation of the shaft 18 in response to variations in relative humidity rotates disc 20 and card 21 to give an indication of relative humidity in a manner now to be described.

Referring now to Figure 1, the housing 1 is provided with a vertical slot 22 and a suitably calibrated scale 23 associated therewith. Indicating card 21 (Figure 4) has a darkened portion bounded by an oblique line as shown and is mounted behind the slot 22 in such a manner that part of the darkened portion of the card is visible through the slot. As the shaft 18 rotates in response to variations in relative humidity, the card 21 is rotated behind slot 22 and the darkened portion of the card as seen through the slot indicates on scale 23 the value of relative humidity. When the relative humidity of the atmosphere in which the device is placed increases, either due to an increase in the absolute humidity of the atmosphere or to a decrease in atmospheric temperature, shaft 18 is rotated clockwise (as shown in Figure 4) to move indicating card 21 to indicate a higher value of relative humidity on scale 23. If, on the other hand, the value of relative humidity decreases, either due to a decrease in absolute humidity or to an increase in temperature of the ambient atmosphere, shaft 18 is rotated counterclockwise to cause the darkened portion of card 21 to indicate a lower relative humidity on scale 23.

Reverting now to Figure 2, it may be observed that with the construction shown, adequate circulation of air through housing 1 is insured. The cap 1a of the housing 1 is provided with the holes 1b as shown. Due to the heating of air within the housing by the element 2, convection currents are established which cause air to enter the housing through its open bottom and flow upwardly and out through slot 22 and the holes 1b in the cap 1a. Thus the element 2 is always in contact with an atmosphere representative of the atmosphere of the room or other space in which the relative humidity is being measured.

Where it is desirable to control the relative humidity of the room or other space in which the relative humidity is being measured, either at a single desired value or within a desired range of values, it may be done in the following manner. In Figure 2, apparatus is illustratively shown for maintaining relative humidity at a desired value by controlling the flow of water in a water supply pipe 25 leading to a suitable humidifying unit (not shown). The flow of water in pipe 25 is controlled by an electrically operated valve such as the solenoid valve 26 which is operated in the following manner. Fixed to the upper portion of shaft 18 there is a contact disc 28 generally composed of non-conductive material but containing a conductive segmental insert 32 (see Figure 3). A contact arm 34 mounted on a support 35 bears against the upper surface of disc 28. The contact arm 34 is so located that when the value of relative humidity is less than a predetermined quantity, the arm makes contact with the conductive insert 32 to complete an electrical circuit which includes contact arm 34, a conductor 36, the secondary of a transformer 38, a conductor 39, the coil of a relay 40, a conductor 41, conductor 10, housing 1, support 3c, shaft 18, and the conductive segment 32 of the disc 28. Electrical energy is supplied to the relay circuit from leads 11 and 12 which are connected to the primary of transformer 38.

The relay 40 has an armature 42 which forms part of a valve-operating circuit including lead 11, a conductor 43, a contact 44, armature 42, a conductor 45, solenoid valve 26, a conductor 46, and lead 12. The arrangement is such that when contact arm 34 bears against segment 32 of disc 28, the relay circuit is completed and the relay actuated to move armature 42 upward against contact 44. This movement of armature 42 completes the valve-operating circuit to open control valve 26 and supply water to the humidifier.

The operation of the apparatus is as follows. As described above, an increase in relative humidity causes helix 15 to unwind and rotate shaft 18 clockwise; whereas a decrease in relative humidity causes helix 15 to wind up and rotate shaft 18 counterclockwise. As the value of relative humidity falls, shaft 18 and hence disc 28 (see Figure 3) rotates counterclockwise; and when the edge 37 of segment 32 makes contact with contact arm 34, the relay circuit and valve-operating circuit are closed to open control valve 26, thus supplying water to the humidifier to increase the relative humidity. When the relative humidity rises, shaft 18 and disc 28 are turned clockwise and eventually contact between arm 34 and segment 32 is broken. This breaks the relay circuit and the valve-operating circuit and valve 26 closes to shut off the supply of water to the humidifying unit. Thus the relative humidity of a room or other space may be maintained substantially at a desired value, which desired value depends upon the position of the edge 37 of segment 32 with respect to the shaft 18. The angular position of the edge 37 with respect to the shaft 18 may, of course, be made adjustable to facilitate changes in the "set point" or desired value of relative humidity to be maintained.

From the above description it is apparent that the present invention provides an unusually compact device for indicating and/or controlling the relative humidity of an atmosphere. For its operation the device requires only a convenient source of electrical energy and the power requirements are relatively small. It is, of course, to be understood that many changes might be made in the embodiment disclosed without departing from the spirit of the invention, the scope of which is to be determined from the claims appended hereto.

We claim:

1. In apparatus for maintaining the relative humidity of an atmosphere at a desired value, in combination, means for supplying water to humidify said atmosphere, means changeable in temperature in response to variations in the absolute humidity of said atmosphere, a bimetallic helix in heat exchange relation with said humidity-responsive means, an oppositely wound bimetallic helix responsive to the temperature of said atmosphere, said second helix being coaxial with and connected to said first helix, control means responsive to the difference in temperature measured by said two helices for regulating said water supply means to decrease the supply of water to humidify said atmosphere when the temperature difference is greater than a predetermined value and to increase the supply of water to humidify said atmosphere when said temperature difference is less than said predetermined value, and indicating means responsive to the difference in temperature measured by said two helices and continuously and freely movable to positions indicative of the relative humidity of said atmosphere.

2. In apparatus for indicating the relative humidity of an atmosphere including humidity responsive means and means for supplying heating energy to said responsive means, said responsive means being adapted to control the supply of heating energy thereto to maintain said responsive means at an equilibrium temperature corresponding to the absolute humidity of said atmosphere, in combination, tubular means in heat exchange relationship with said humidity responsive means and maintained substantially at said equilibrium temperature by said humidity responsive means, movable temperature responsive means mounted within said tubular means and freely movable to positions corresponding with the temperature of said tubular means, movable temperature responsive means separate from said tubular means and responsive to the temperature of said atmosphere, and means responsive to the differential movement of said two temperature responsive means for indicating the relative humidity of said atmosphere.

3. In apparatus for indicating the relative humidity of an atmosphere including humidity responsive means and means for supplying heating energy to said responsive means, said responsive means being adapted to control the supply of heating energy thereto to maintain said responsive means at an equilibrium temperature corresponding to the absolute humidity of said atmosphere, in combination, tubular means in heat exchange relationship with said humidity responsive means and maintained substantially at said equilibrium temperature by said humidity responsive means, movable means located within said tubular means and movably responsive to the temperature thereof, movable temperature responsive means separate from and below said tubular means and responsive to the temperature of said atmosphere, a casing surrounding said tubular means and said second temperature responsive means and adapted to assist in maintaining a flow of said atmosphere past said second responsive means and then past said tubular means, means responsive to the differential movement of said two temperature responsive means for indicating the relative humidity of said atmosphere.

4. In apparatus for indicating the relative humidity of an atmosphere including humidity responsive means and means for supplying heating energy to said responsive means, said responsive means being adapted to control the supply of heating energy thereto to maintain said responsive means at an equilibrium temperature corresponding to the absolute humidity of said atmosphere, in combination, tubular means in heat exchange relationship with said humidity responsive means and maintained substantially at said equilibrium temperature by said humidity responsive means, movable means located within said tubular means and movably responsive to the temperature thereof, movable temperature responsive means separate from and below said tubular means and responsive to the temperature of said atmosphere, means responsive to the differential movement of said two temperature responsive means for indicating the relative humidity of said atmosphere and a casing surrounding said tubular means and said second temperature responsive means and adapted to cooperative with said heated humidity responsive means to induce a flow of said atmosphere past said second temperature responsive means and then past said tubular means.

5. In apparatus for indicating the humidity of an atmosphere including humidity responsive means and means for supplying heating energy to said responsive means, said responsive means being adapted to control the supply of heating energy thereto to maintain said responsive means at an equilibrium temperature corresponding to the absolute humidity of said atmosphere, in combination, tubular means in heat exchange relationship with said humidity responsive means and maintained substantially at said equilibrium temperature by said humidity responsive means, movable temperature responsive means located within said tubular means and freely movable to positions corresponding with the temperature of said tubular means, a shaft rotated by said movable means, a linear humidity reference scale and means including a diagonal index mounted on said shaft for registration of said index with said scale as an indication of the rotational positions of said shaft.

6. In apparatus for indicating the humidity of an atmosphere including humidity responsive means and means for supplying heating energy to said responsive means, said responsive means being adapted to control the supply of heating energy thereto to maintain said responsive means at an equilibrium temperature corresponding to the absolute humidity of said atmosphere, in combination, tubular means in heat exchange relationship with said humidity responsive means and maintained substantially at said equilibrium temperature by said humidity responsive means, movable temperature responsive means located within said tubular means and freely movable to positions corresponding with the temperature of said tubular means, a shaft rotated by said movable means, a casing enclosing said tubular means and said movable means and having an aperture therein, a linear humidity reference scale adjacent said aperture and a diagonal index mounted on said shaft and visible through said aperture, said index and said scale cooperating to indicate the humidity of said atmosphere.

ALBERT ALLEN.
ROBERT W. CUSHMAN.